May 15, 1934. G. E. NICHOLSON 1,959,084
VENDING MACHINE
Filed Oct. 21, 1929 9 Sheets-Sheet 4
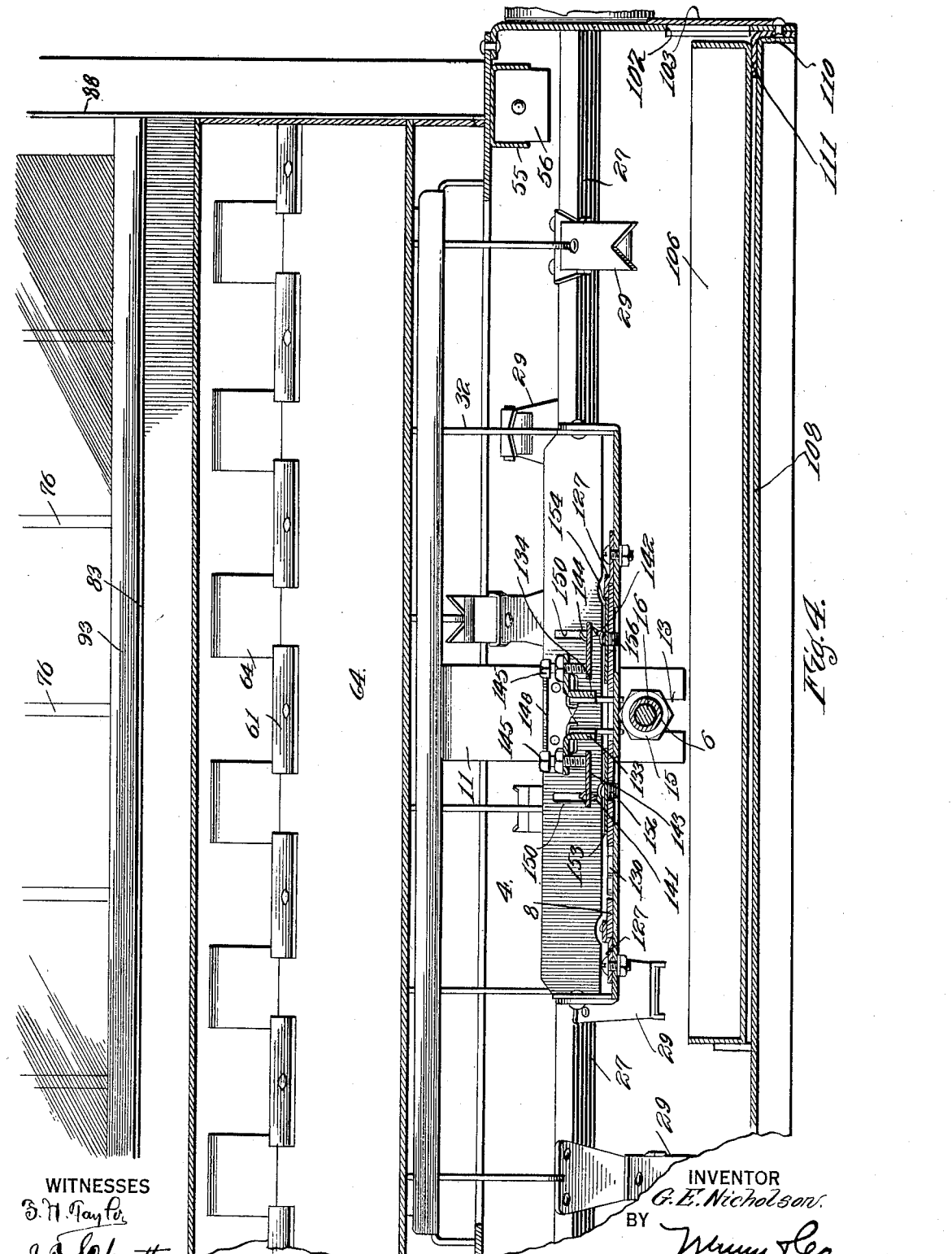
WITNESSES
INVENTOR
G. E. Nicholson.
BY
ATTORNEY

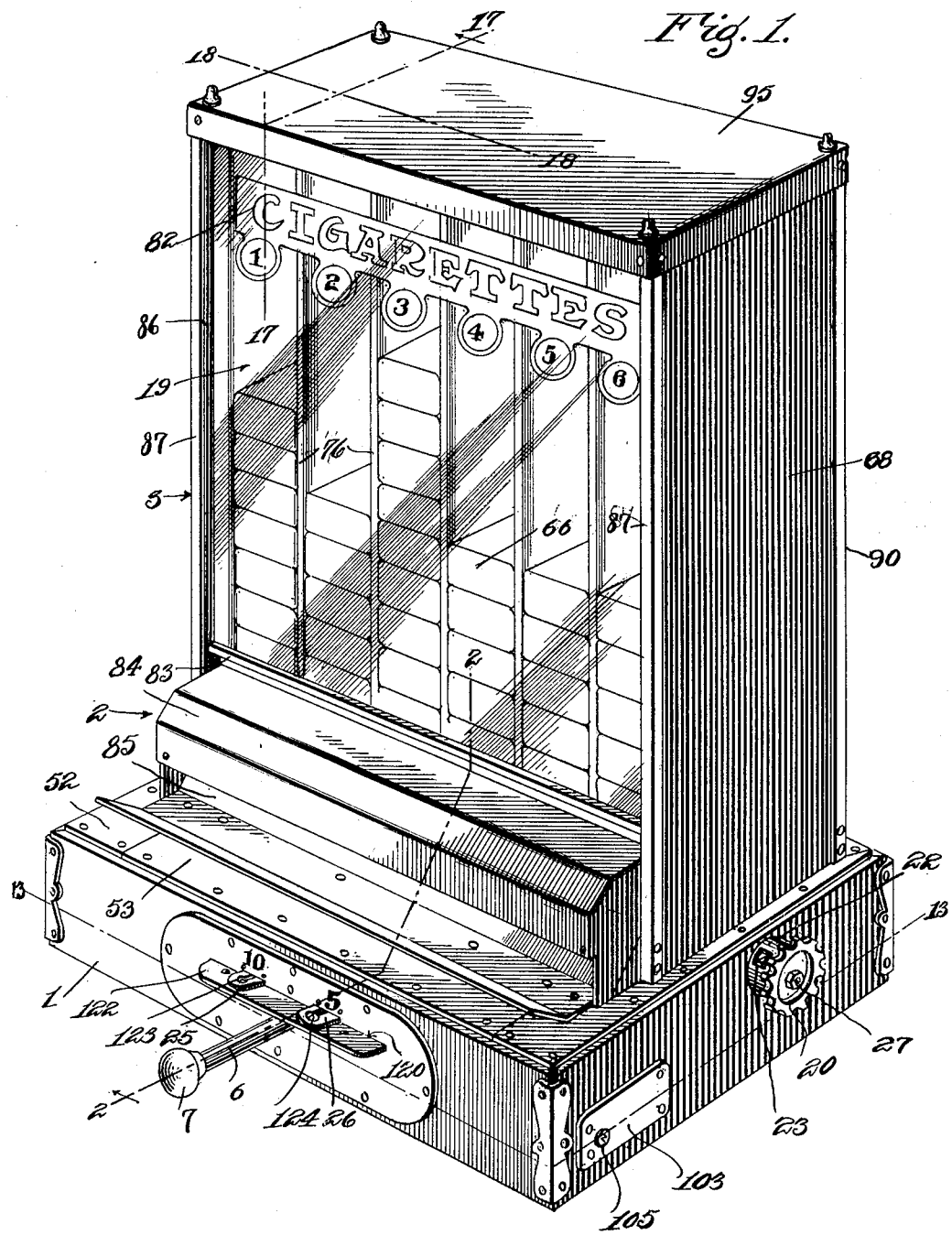

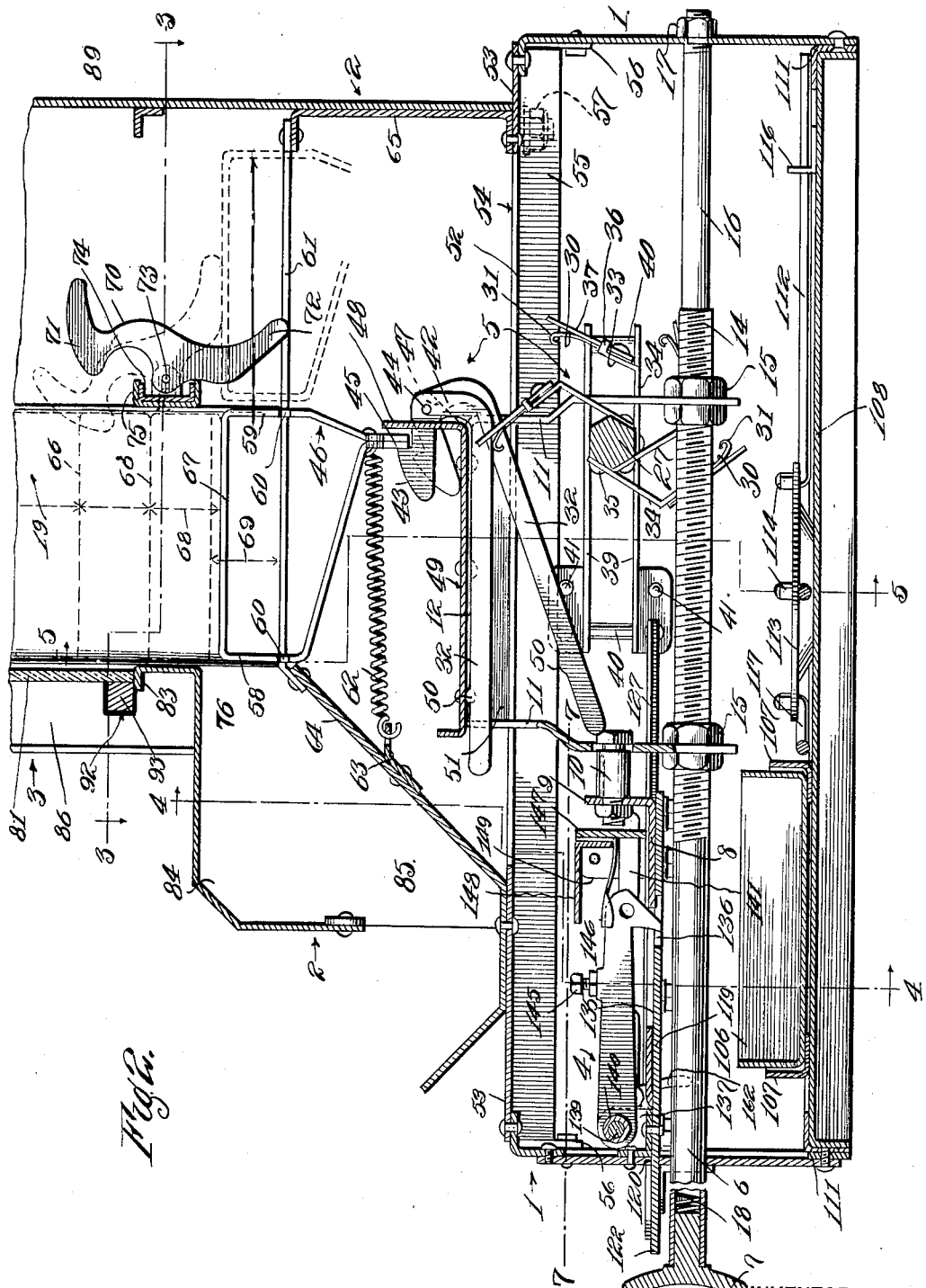

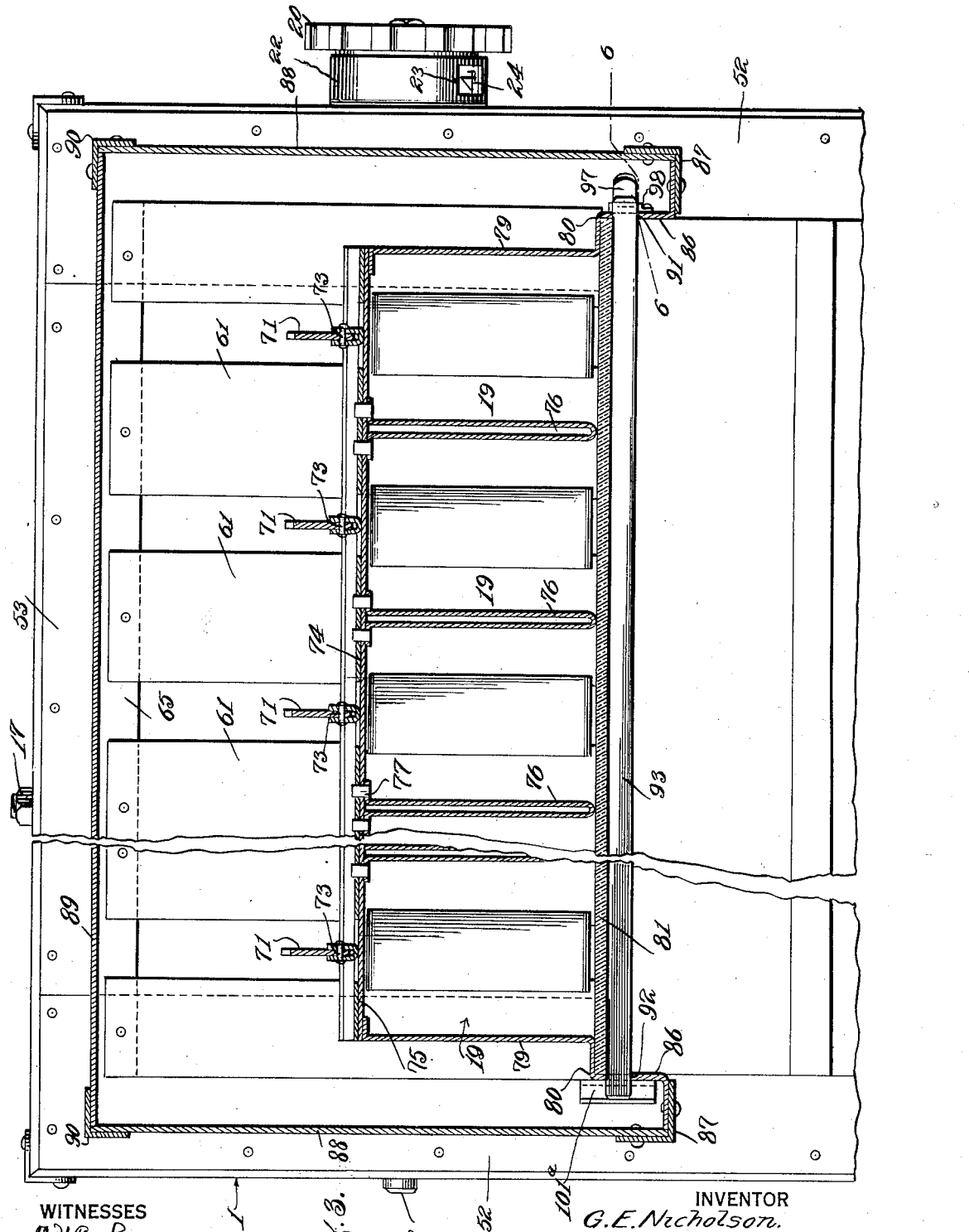

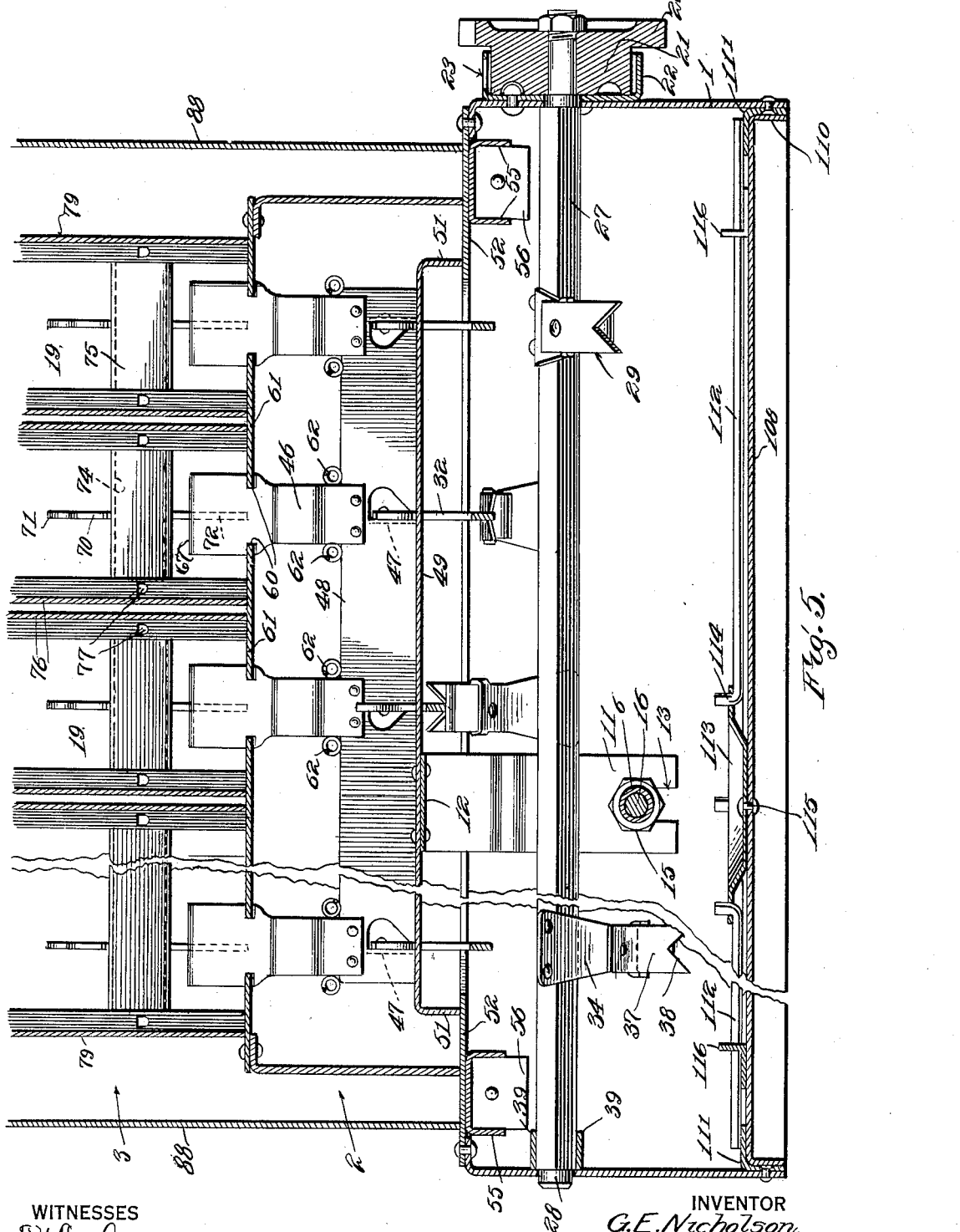

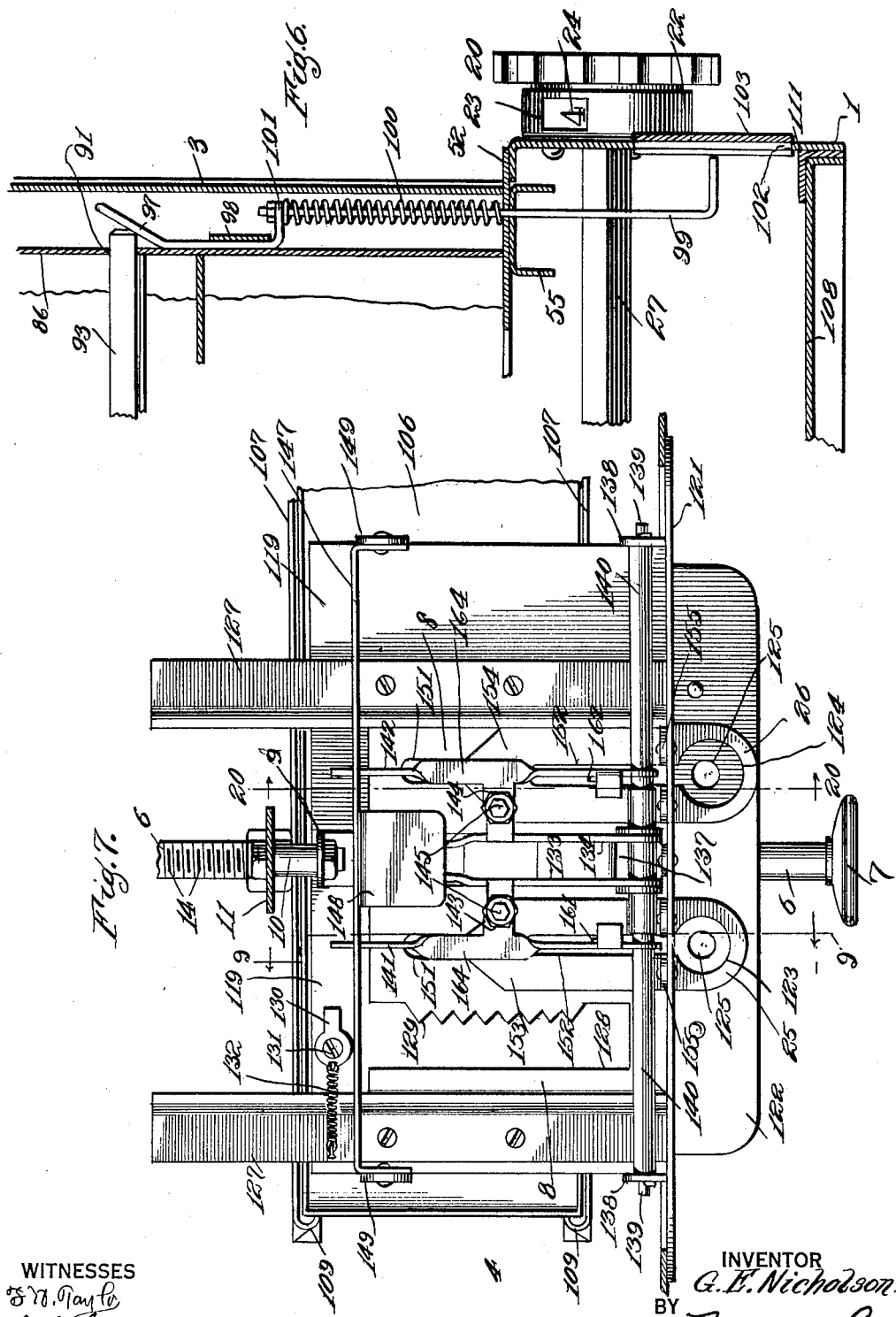

May 15, 1934.   G. E. NICHOLSON   1,959,084
VENDING MACHINE
Filed Oct. 21, 1929   9 Sheets-Sheet 7
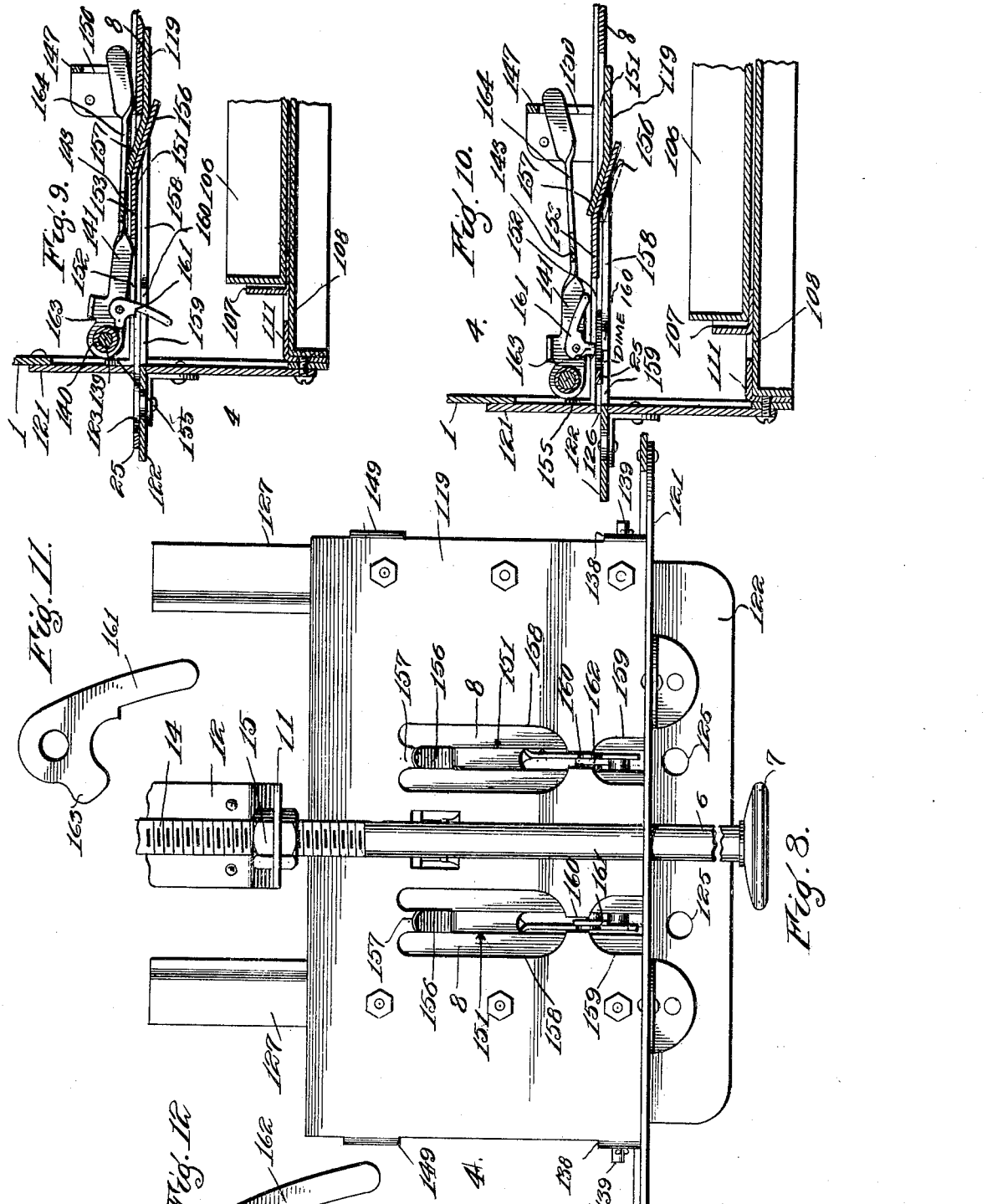

May 15, 1934.　　　G. E. NICHOLSON　　　1,959,084
VENDING MACHINE
Filed Oct. 21, 1929　　　9 Sheets-Sheet 8
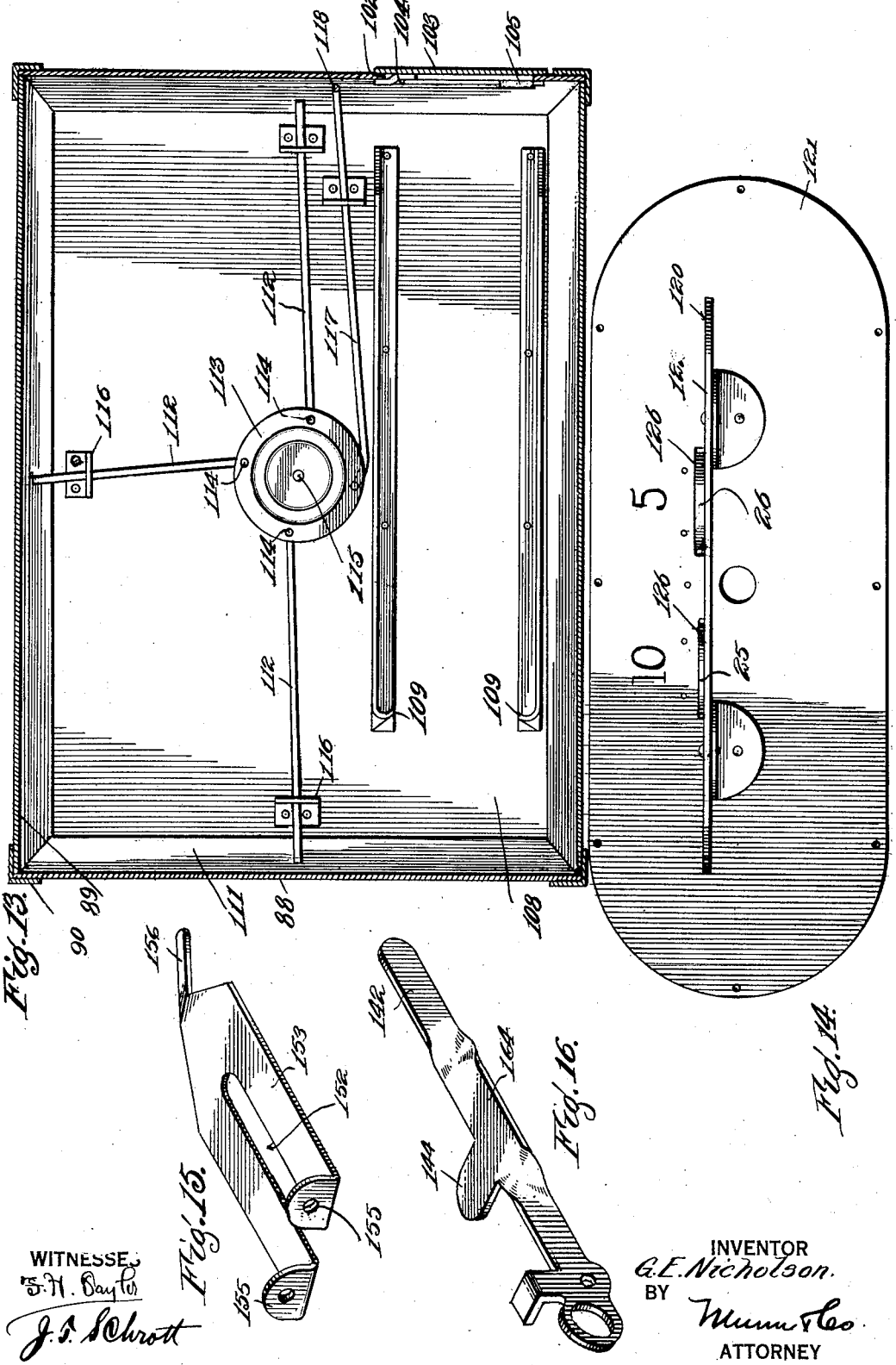
INVENTOR
G. E. Nicholson.
BY
ATTORNEY

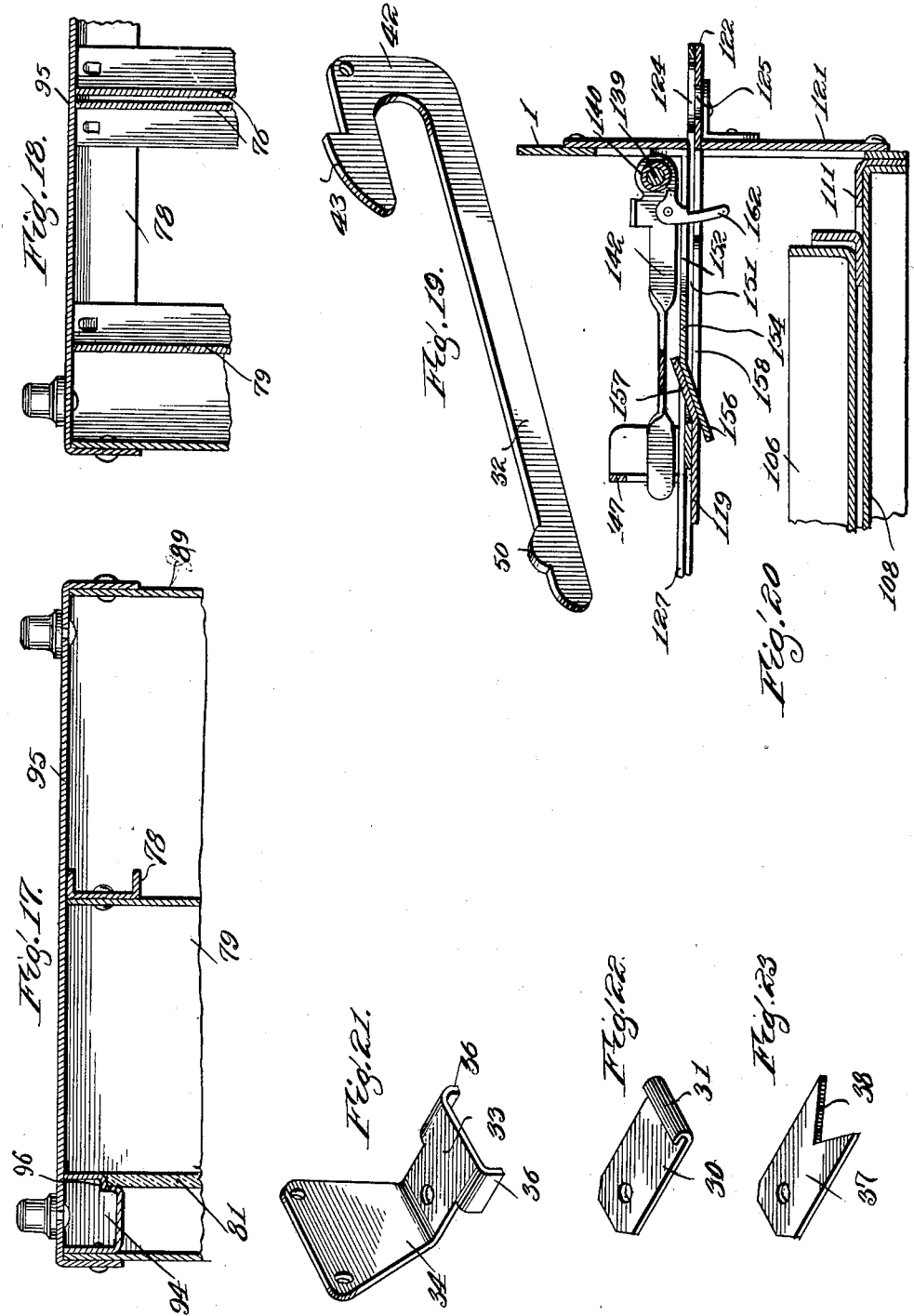

Patented May 15, 1934

1,959,084

UNITED STATES PATENT OFFICE 1,959,084

VENDING MACHINE

George E. Nicholson, Tulsa, Okla., assignor to Vending Machine Corporation of America, Tulsa, Okla., a corporation of Delaware Application October 21, 1929, Serial No. 401,207

3 Claims. (Cl. 312—66)

This invention relates to improvements in vending machines and it consists of the constructions, combinations and arrangements herein described and claimed.

An object of the invention is to provide each lifter with a V-notch so as to centralize the selected selector finger with respect to the lifter when lifting it thereby, said finger being loosely hung upon the selector plate.

A further object of the invention is to improve the vending machine disclosed in Patent No. 1,940,603 issued to George E. Nicholson on Dec. 19, 1933, by so disposing the discharger slide and selector finger on opposite sides of the selector plate and so overlapping the lug of said slide with the upstanding wall of the plate, by which the finger is pivotally carried, that the heel of the finger is readily extended through the wall into engaging range of the lug and is engaged with the lug when the finger is actuated by the lifter.

Other objects and advantages will appear in the following specification, reference being had to the accompanying drawings, in which:—

Figure 1 is a perspective view of the improved vending machine;

Fig. 2 is a cross-section of the base, superbase and a portion of the merchandise container taken on the line 2—2 of Fig. 1;

Fig. 3 is a horizontal section taken on the line 3—3 of Fig. 2, a portion of the structure being broken out to permit making the illustration on a reasonably large scale;

Fig. 4 is a vertical section taken on the line 4—4 of Fig. 2, a portion of the left end being omitted;

Fig. 5 is a vertical section taken on the line 5—5 of Fig. 2, a portion of the structure again being broken out;

Fig. 6 is a detail vertical section of the foregoing latch means, taken substantially on the line 6—6 of Fig. 3;

Fig. 7 is a detail horizontal section taken on the line 7—7 of Fig. 2, particularly illustrating an improved coil control;

Fig. 8 is an inverted plan view of the coin control, portions of the base being shown in section;

Fig. 9 is a cross-section taken substantially on the line 9—9 of Fig. 7 showing the dime component in the original position;

Fig. 10 is a similar view of the structure illustrating the re-positioning of the parts when a dime is introduced;

Fig. 11 is a detail side elevation of the slug eliminator for the dime component of the coin control;

Fig. 12 is a side elevation of the slug eliminator for the five-cent component of said control;

Fig. 13 is a horizontal section of the base to show the improved bottom locking arrangement taken on the line 13—13 of Fig. 1;

Fig. 14 is an elevation of the front cover plate;

Fig. 15 is a perspective view of the coin plate spring used in conjunction with the coin control;

Fig. 16 is a perspective view of one of the lift fingers of the coin control;

Fig. 17 is a detail cross-section taken on the line 17—17 of Fig. 1 illustrating a portion of the merchandise container construction;

Fig. 18 is a detail section taken on the line 18—18 of Fig. 1 again illustrating such construction;

Fig. 19 is a perspective view of one of the selector fingers;

Fig. 20 is a section taken on the line 20—20 of Fig. 7, particularly illustrating the five-cent component of the coin control;

Fig. 21 is a perspective view of the base of one of the lifters;

Fig. 22 is a perspective view of one of the resilient finger contactors; and

Fig. 23 is a perspective view of one of the contactor retainers.

This machine is intended to vend packages of cigarettes selling for fifteen cents, at which price a number of brands of cigarettes can be purchased on the market. Since the machine is liable to operation by persons of all characters, particular attention has been paid to the production of a rugged construction with the utmost simplicity in detail so that damage at the hands of careless and irresponsible purchasers can be warded off in the first instance, and in the second instance, that necessary replacements and repairs can be made easily and cheaply in case something should go wrong.

Attention is directed to the drawings. The machine comprises a base 1, superbase 2, merchandise container 3, coin control 4 and selector mechanism generally designated 5. The base 1, superbase 2 and container 3 are in communication on the inside of the machine (Fig. 2) and it is in the communicating parts that the coin control 4 and selector mechanism 5 are located and work.

A tubular plunger 6 (Figs. 1, 2, 5 and 7) is slidable through the front of the base 1 and carries a button 7 by which a push is exerted as the first act in the proper dispensation of a package of cigarettes. Connected with the plunger is a coin plate 8 that partakes of every movement of the plunger. The coin plate has an upstanding lug 9 that is secured at 10 to one of a pair of arms 11 of a selector plate bracket 12. The extremities of the arms are slotted at 13 (Figs. 4 and 5) to permit ready emplacement of the bracket upon the plunger. The inner end of the plunger is threaded at 14 to receive pairs of nuts 15 which are locked tight against the sides of the arms (Fig. 2). The plate 8 and bracket 12 are thus fixed to the plunger.

The tubular plunger 6 receives and slides upon a spindle 16 which is suitably fixed in reference to the base 1, for example, by means of a nut 17 secured onto a threaded extension of the spindle in back of the base. A spring 18 interposed between the inner end of the spindle and the plug end of the button 7 tends to keep the plunger pressed forwardly.

A selection of cigarette packages in any one of a plurality of column spaces 19 (Figs. 1, 2 and 3) is made by bringing the selector mechanism 5 into play. The outer control of this mechanism comprises a selector knob or wheel 20 (Figs. 1, 3 and 5) the hub 21 of which fits in and is largely concealed by a cup 22 secured to the adjacent side of the base. The cup has a single sight opening 23 (Figs. 3 and 5) through which numerals 24 become visible as the knob is turned in either direction.

These numerals run from "1" to "6" and have reference to the six column spaces (Fig. 1) which are similarly numbered so that the purchaser may have a guide before him as to how to work the selector mechanism. If he wants a package of cigarettes from the column space denoted "4" he will turn the knob 20 until that numeral appears in the opening 23. He may then insert the proper coins in the receivers 25 and 26 (Fig. 7) of the coin control and push in on the button 7 whereupon the goods will be delivered.

One end of a selecting shaft 27 (Fig. 5) is sufficiently reduced and threaded to fixedly receive the knob 20. The opposite end of the shaft is reduced to form around a trunnion 28 and it is by the engagement of the reductions with holes in the sides of the base 1 that the necessary bearing for the shaft is provided. The shaft in the present instance has six sides, one for each of an equal plurality of lifters 29.

Since the lifters are alike in construction, the description of one will suffice for all. The lifter 29 comprises a resilient contactor 30 (Figs. 2 and 22) one end of which is curled over at 31 to smoothly and easily engage a companion selector finger 32 of which there is a series of six to agree in number with the number of column spaces 19.

The contactor 30 is secured to the angled end 33 of a base 34 (Fig. 21) in turn secured at 35 to one of the sides of the selecting shaft 27 (Figs. 2 and 5). Clips 36 (Fig. 21) assist in retaining the contactor 30 and a stiff retainer 37 that is secured to the angled end 33 in common with the contactor 30. The free end of the retainer is forked or notched at 38 to centralize the companion selector finger 32 when the lifter is moved around into contact therewith. The selector fingers are rather loosely mounted, and should any one be slightly out of line with the lifter the notch 38, which is preferably of a V-shape, will serve to guide the selector finger over toward the center so that there may be a balanced application of the resilient contactor 30.

A pair of spring arms 39 (Figs. 2 and 5) act as a brake for the selecting shaft 27. The extremities of the spring arms are held separated by spacers 40. The selecting shaft turns within the arms at a point approximately midway of the length of the arms. As the shaft is turned, the corners of the angled parts will bow the spring arms outwardly but the spring arms will bear down on opposite flat sides thus to securely hold the selecting shaft in the adjusted position yet not so tightly as to obstruct a free turning of the knob 20. One end of each spring arm is secured at 41 to the side of the base. The other ends are free with the exception of the connection afforded by the spacer 40.

Referring to the selector fingers 32 of which mention has been made, it is observed that each finger is formed into an elbow 42 and heel 43 (Figs. 2 and 19), respectively, for the purpose of receiving a pivot pin 44 and to engage a lug 45 on the nether portion of a companion discharger slide 46. Each finger is pivoted to ears 47 (Figs. 2 and 5), stamped up from the rear upstanding wall 48 of a slidable selector plate 49. The lug 45 extends into overlapping relationship with the wall 48 at one side thereof. The pivotal support 44 of the finger 32 is situated on the other side of the wall. The heel 43 extends through the wall from the point of the support 44 into engaging range of the lug. It is to this plate that the bracket 12 is connected and by motion of the tubular plunger 6 the selector plate 49 as well as the entire series of fingers 32 are moved in consonance.

Since the selector fingers are pivoted at the elbow ends, it follows that the forward ends are free to gravitate to an angled position (Fig. 2), the engagement of the point of the heel 43 with the selector plate 49 limiting the extent of gravitation. Each finger has a nib 50, adapted to engage the under side of the plate 49 when the finger is in the raised position (Fig. 2), thus to limit the contact of the finger with the plate to a single point. When lifted, the nether edge of the finger is parallel with the selector plate.

The side extremities of the selector plate 49 are bent down at 51 (Fig. 5) to ride upon a pair of plates 52 which comprise a part of the top of the base 1. The top is completed by a pair of similar plates 53 (Fig. 2). The top may consist of a single rectangular frame instead of the four plates mentioned, but in any case, there would be a large central opening 54 (Fig. 2) through which the foregoing communication of the base and superbase 1 and 2 is had.

Channels 55 (Figs. 2 and 5) are used to reinforce the top so that the top may constitute an adequate support for the superbase 2 and merchandise container 3. The longitudinal extremities of these channels are flanged at 56 (Fig. 2) and secured to the front and back of the base 1. The superbase and merchandise container are secured to the top of the base through the channels 55 by means of bolts and nuts 57 (Fig. 2).

The pusher and rear ends 58 and 59 of each discharger slide 46 are notched at 60 on opposite edges to receive the edges of discharger guides 61 upon which the dischargers are slidable from the full line to the dotted line position in Fig. 2 and vice versa. The rearward movement is accomplished through the medium of the engaging heel 43 of a selected finger 32, and the return movement is accomplished by pairs of springs 62 (Figs. 2 and 5). One end of each pair of springs is connected with the respective slide 46, the other end to a spring clip 63 (Fig. 2)

that is secured to the under side of a front plate 64.

The front ends of the guides 61 are secured to the upper part of the front plate 64 (Fig. 2) while the rear ends are secured to a supporting and reinforcing channel 65. The guides 61 are spaced (Figs. 3 and 5), and the dischargers 46 slide in the spaces which they occupy.

A column or stack of cigarette packages 66 (Figs. 1 and 2) is supported on the level of the top portion 67 of the discharger slide 46, using the discharger column "4" (Fig. 1) for illustration. When the discharger is slid rearwardly to the dotted line position (Fig. 2) the column or stack drops a distance approximately equal to the thickness of a package so that the lowermost package originally occupying the position 68 (Fig. 2) will drop to the position 69. Upon the return of the discharger the lowermost package will be pushed out within reach of the purchaser.

In order that a very smooth delivery of the lowermost package may be made a package retainer 70 (Fig. 2) is employed. There is one of these for each of the article columns. The retainer 70 (Fig. 2) comprises a blunt hook or presser 71 and a heel 72. The retainer is pivoted at 73 adjacently to the article stack to a retainer channel 74 which extends crosswise of the columns (Figs. 3 and 5).

The retainer is loosely mounted on its pivotal support so that the heel 72 is free to gravitate to a resting position. At this time the presser 71 is held away from the article stack, it being noted that the presser is so offset with respect to the heel that the foregoing condition will occur automatically by the gravitation of the heel.

A channel 75 contains the retainer channel 74 largely for the purpose of mutual reinforcement. It is to both channels that the lower ends of a series of flanged column separators 76 are secured at 77 (Fig. 3). The upper ends of the column separators are secured to a cross channel 78 (Fig. 18). Fig. 17 illustrates the place of connection of one or a pair of column sides 79 (Figs. 3 and 5).

These sides define the side closures of the extreme columns "1" and "6". The column sides are shaped into recesses 80 (Fig. 3) in which the vertical edges of a glass pane 81 fit. This pane comprises the front cover of the merchandise container 3. The pane may be embellished with the name of the commodity to be sold as designated at 82 (Fig. 1). The pane rests upon a flange 83 (Figs. 1 and 2) forming part of a hood 84 over an outlet chute 85.

Outer flanged extremities 86 of the column sides 79 (Fig. 3) are secured behind front corner brackets 87 and define parts of a wall that defines the merchandise container 3. The sides 88 and back 89 complete the enclosure, corner brackets 90, similar to the brackets 87 being secured at the rear corners to brace the container. Openings 91 and 92 in the extremities 86 (Figs. 2, 3 and 6) receive the ends of a locking bar 93 which holds the glass pane 81 after it has once been inserted.

To this end it is to be observed in Fig. 17 that a filler 94 is incorporated in the top 95 at the front edge. The filler is situated behind the front 1 of four flanges that fit down around the four sides of the merchandise container. The filler is recessed at 96 to receive the upper edge of the pane. This recess connects with the recesses 80 (Fig. 3) and it is in the connected recesses that the pane is slid and positioned prior to being stood upon the flange 83 (Fig. 2).

Obviously the placing of the pane in position must be accomplished in the absence of the locking bar 93. This bar is removed by displacing the latch means in Fig. 6. This is situated at the right end of the locking bar (Fig. 3). The latch means comprises a latch 97 which is guided in a bracket 98 and connected with a pull rod 99 which has a spring 100 assembled thereupon and so arranged that the latch is normally held in the upper position. The bent end 101 to which the pull rod is connected is engageable with the bracket 98 thus to limit the action of the spring.

The left end of the locking bar 93 (Fig. 3) is engageable with a stop 101$^a$ which limits the sliding of the bar to the left. The latch 97 and stop 101$^a$ are located beside the respective openings 91 and 92. Upon desiring to remove the pane 81, it is first necessary to remove the locking bar 93. A downward pull on the rod 99 will displace the latch 97 sufficiently to permit sliding of the locking bar 93 to the right until the left end can be disengaged from the opening 92. The bar is then shifted to the left and disengaged from the opening 91. The pull rod 99 is released and the pane lifted from the flange 83 and out of the front of the container 3.

Access to the angled end of the pull rod 99 (Fig. 6) which is concealed on the inside of the machine is had through a drawer opening 102 in the right side of the base (Figs. 1 and 13). A door plate 103 closes the opening. This carries a lug 104 at one end that fits over one edge of the opening and a lock 105 on the other end, the bolt of which can be extended by use of a key to engage the opposite edge of the opening. Upon opening the lock the door plate can be swung away as though hinged at the lug 104, and laid aside so that the operator can reach through the opening and pull the rod 99 down if it is his intention to remove the pane 81 for the replenishment of the stock.

Other purposes would be to remove a money drawer 106 (Figs. 2 and 4) which is slidable between longitudinal guides 107 (Fig. 2) secured to a removable bottom 108 (Fig. 13). The inner ends of the guides 107 are bent at 109 to stop the drawer in the proper position.

The bottom 108 is peripherally flanged at 110 and fits up inside of a series of angles 111 secured around the inner nether edge of the base 1 to provide a rest or stop for the bottom. These angles also constitute a lock flange with which the ends of a plurality of locking plungers 112 (Fig. 13) are engageable when a plunger disk 113 to which the inner ends of the plungers are pivoted at 114 is rotated upon its pivot 115. The disk 113 is dished or concaved (Fig. 5) to provide an annular flange to which the up-turned inner ends of the plungers 112 are pivoted as already indicated. The plungers are guided by guides 116 which, like the disk 113, are mounted on the bottom 108.

A locking lever 117 is also pivoted to the disk 113 and the outer end is bent up at 118 in the vertical direction to provide a hand grip. The lever 117 is manipulated by reaching through the drawer opening 102. An inward push will rotate the disk 113 clockwise and retract all of the plungers 112 from engagement with the lock flange 111, whereupon the entire bottom 108 can be removed. An outward pull on the locking lever after the bottom has been inserted will have the reverse effect.

The coin control comprises a simplified construction for causing operation of the machine when the proper combination of coins is inserted and for selecting between good coins and slugs. The latter are usually perforated with a central hole of considerable size for the purpose of preventing persons from passing them as coins, and it is slugs of this type that will not operate the machine even though they be identical in diameter and thickness with either a dime or five-cent piece.

The coin plate 8 to which reference has been made is slidable upon a base plate 119 which is fixed upon the base 1. The forward portion of the base plate projects through a slot 120 in a front cover plate 121 (Figs. 1, 2 and 14) providing a shelf 122 upon which the receivers 25 and 26 (Figs. 1 and 7) appear when the plunger 6 is in the foremost position.

Immediately below the dime and five-cent holes 123 and 124 (Fig. 7) the shelf 122 has apertures 125 into which the operator can press the flesh of his fingers sufficiently far to dislodge a coin should he change his mind about making the purchase. The slot 120 is enlarged at 126 to provide passages in which the coin receivers 25, 26 are slidable.

Guides 127 (Figs. 2, 4 and 7) slidably receive the lateral edges of the coin plate 8. This plate has a passage 128 opening at the rear or inner edge of the coin plate, one side of which is serrated to provide teeth 129 with which a pawl 130 is engageable to prevent a premature retraction of the plunger 6 as well as a second inward movement of the plunger without inserting other coins in the receivers 25 and 26 (Fig. 7). In the first instance, the purchaser is compelled to push the plunger 6 all the way in and is thus assured that he will get his goods. In the second instance, he is prevented from repeatedly working the plunger to deliver more goods than he is paying for.

This pawl stands at the open end of the passage 128. It is pivoted at 131 to the base plate 119. A light spring 132 connected with the pawl at one side of the pivot and with a suitable stud on the base plate keeps the pawl in the position shown in Fig. 7. Locking hooks 133, 134, of which there are a pair, limit the permissible idle inward movement of the coin plate 8 as well as all attached parts.

The extent of this permissible movement is insufficient to permit engagement of the pawl 130 behind the first or innermost tooth of the series 129 (Fig. 7). It is only when the proper coins are inserted that the locking hooks will be raised to permit a sufficient extensive inward movement of the coin plate to bring the teeth 129 into registration with the pawl 130. The inward idle movement of the coin plate is limited by the engagement of one side of an opening 135 in the coin plate (Fig. 2) with the points of the hooks 133, 134. These points extend through this opening as well as an opening 136 in the base plate 119. The forward movement of the coin plate is limited by the engagement thereof with a central bracket 137 upon which as well as upon ears 138 (Fig. 7) a common pivot shaft 139 is supported.

Spacer sleeves 140 not only keep the locking hooks 133, 134 in the proper position, but serve the same purpose for a pair of lift fingers 141, 142. The lift fingers have inwardly directed tongues 143, 144 with which screws 145 of the hooks 133, 134 are held in contact by springs 146 (Fig. 2) that are made to bear upon the free ends of the hooks.

These springs are parts of a spring plate which is secured to a guide plate 147 in common with a guard 148 which extends over the spring. The ends of the guard plate are secured to ears 149 (Fig. 7) bent up from the base plate 119. The guide plate has slots 150 (Fig. 4) in which the ends of the fingers 141, 142 work.

Slots 151 (Fig. 7) in the slidable coin plate 8 coincide with similar slots 152 in each of a pair of spring plates 153, 154. These spring plates are secured at 155 (Fig. 7) to the cover plate 121 and are disposed immediately above the coin plate 8. In other words, the spring plates are spaced from the base plate 119 and the coin plate 8 slides between the two.

The inner ends of the spring plates 153, 154 are reduced to tongues 156 (Figs. 8 and 15) which are bent downwardly and rearwardly to engage the under sides of corresponding tongues 157 (Figs. 8, 9 and 10) bent forwardly from the base plate 119 and upwardly so as to occupy the slots 151 of the movable coin plate 8.

It is the purpose of the combined tongues 156, 157 to insure the ejection of a coin stuck in the coin holes 123, 124 intentionally or otherwise. Should a coin be wedged in the hole it will ultimately ride upon the downwardly directed tongue 156 (Fig. 10) and thus be pried loose so that it will fall into the money drawer 106.

Openings 158, 159 (Figs. 8, 9 and 10) produce in the base plate 119 places where either full-size or under-sized coins will fall through. The openings 159 are smaller than the companion openings 158 and are situated in advance thereof. The openings are connected by slots 160 in which slug eliminators 161 (Fig. 9) and 162 (Fig. 10) hang and swing. These eliminators resemble bell cranks (Figs. 11 and 12). They are pivoted to the respective lift fingers 141, 142.

Normally the slug eliminators hang down as shown in Fig. 9, but upon presentation of good coins thereto the heels 163 will ride upon the coins (Fig. 10) causing the lifting of the lift fingers 141, 142 and the consequent raising of the hooks 133, 134 by means of the tongues 143, 144 and contact screws 145 from their locking positions against the forward edge of the opening or locking slot 135 in the coin plate 8.

There are many vending machines on the market in which the unlocking mechanism can be successfully operated by inserting a cent wrapped in paper in the five-cent slot. Should a wrapped cent be placed in this device, the slug eliminator will press down the forward edge of the wrapped coin and will catch on the forward radius of the coin, preventing unlocking of the mechanism. As previously indicated, the reduced openings 159 (Fig. 8) allow the coins of too small diameter to drop out before any operation of the coin control can result.

Revert briefly to the lift fingers 141, 142 (Figs. 7, 9 and 10). It is observed that these are given double twists to produce horizontally flat places 164 at points intermediate the ends. This not only brings the tongues 143, 144 in the proper positions, but what is more important imparts resiliency to the lift fingers so that they may yield to a limited degree especially when new money of original thickness is inserted in the coin control. When thin worn money of allowable wear is inserted, unlocking of the machine can be accomplished without bending the respective lift finger.

The operation is readily understood.

The merchandise container 33 is filled with packages of cigarettes. In the present instance, six kinds are to be sold but the character of the mechanism is such that properly designed machines will handle greater or smaller numbers of stacks of goods. Turn the selector knob 20 (Fig. 1) until a numeral 24 (Fig. 3) appears in the side opening 23 in agreement with the selected column 19. The column "4" is chosen for illustration.

The act of turning the knob 20 turns the selecting shaft 27 (Fig. 2) so that the successive lifters 29 are brought into engagement with the selector fingers 32. These fingers normally hang down, as shown in one instance in Fig. 2, but the action of the lifters 29 is to raise the successive fingers 32 to the horizontal position also shown in Fig. 32. The heel 43 of the raised finger will engage the lug 45 of one of the discharger slides 46, which slide thus becomes the selected member which will later push out a package of the selected cigarettes.

Insert a dime and a five-cent piece in the respective holes 123, 124 (Figs. 1 and 7). Push in on the plunger button 7. The plunger 6 is connected with the coin plate 8 (Fig. 7) at 10 (Fig. 2) through the medium of one of the arms 11 of the bracket 12 which is also the instrument of connection of the plunger with the selector plate 49. These parts thus move together.

It is important to observe that there must be a proper assemblage or combination of coins to work the coin control. The combination herein chosen is a dime and a five-cent piece. Either alone will not release the coin plate 8. For example, should only one of the locking hooks 133, 134 be raised the other would still be down in the path of the coin plate as in Fig. 2. Both must be raised simultaneously to permit passage therebeneath of the coin plate.

An inward push of an extent sufficient to displace the pawl 130 (Fig. 7) and permit it to engage with the first tooth 129 will also bring the coins under the slug eliminators 161, 162, as illustrated, for example, in the instance of the slug eliminator 161 in Fig. 10, raising the lift fingers 141, 142 and thus by means of the engaging tongues 143, 144 and contact screws 145 (Fig. 7) raising the locking hooks 133, 134 past which the forward edge of the locking opening 135 (Fig. 2) has by this time moved. In the absence of coins, the permissible idle movement would have brought the forward edge into engagement with the locking hooks which, in the event of no coins to cause their displacement, would remain in the position in Fig. 2 and thus prevent further inward movement of the plunger.

A continued push, sufficient to bring the pawl 130 (Fig. 7) into engagement with the second or third tooth 129, will find the coins dropping out into the coin drawer 106. Since the pawl 130 is angled inwardly against the teeth 129, it will be impossible to retract the plunger 6 or coin plate 8 and the purchaser must continue the inward push until the full stroke is made. The engagement of the head of the passage 128 with the shoulder or round part of the pawl 130 limits the inward movement of the coin plate and plunger.

Upon the return movement of the plunger by action of the spring 18 (Fig. 2) the pawl 130 (Fig. 7) will be angled in the other direction, successively engaging the teeth 129 to prevent a repetition of the inward movement until the entire series 129 has been traversed. During the period of forward movement, the locking hooks 133, 134 are raised by the solid part of the coin plate 8 adjoining the opening 135 (Fig. 2), and before the transit of the pawl 130 over the tooth series 129 has been completed, the locking hooks will have dropped into the openings 135, 136 (Fig. 2) in readiness to prevent a repetition of the inward stroke without coins and to limit the permissible idle inward stroke.

During this performance, the lowermost package 69 (Fig. 2) was discharged into the outlet chute 85 within reach of the purchaser. As the foregoing inward push was performed the active one of the selector fingers 32 carried the selected discharger slide 46 to the dotted line position (Fig. 2). During this action the retainer 70 was moved to the dotted line position to retain the entire stack with the exception of the lowermost package.

The lowermost package is thus relieved of the weight of the entire stack and the act of discharging it is made smooth and easy. The stack is retained merely by the pressure of the blunt hook 71 which makes but a slight impression on the nearest package. The lowermost package, having dropped down upon the discharge guides 61 is in position for displacement upon the return of the plunger and the slide 46.

A slug with a central hole, even if otherwise identical in diameter and thickness with a dime or five-cent piece, will be unable to assist in operating the coin control for this reason. Take the instance of the dime in Fig. 10. The slug eliminator 161 normally hangs down, as shown in Fig. 9. The first act of the dime is to swing the eliminator around until the heel bears on top of the coin (Fig. 10). If the coin were substituted by a slug with a central hole the heel 163 would enter the hole and merely cause a partial turning of the slug eliminator and not that raising of the lift finger 141 essential to the raising of the locking hook 133.

Should it be desired to replenish the stock of merchandise in the container 3, the proprietor has only to pull down on the rod 99 (Fig. 6) after removing the door plate 103 (Figs. 1 and 13), whereupon he can shift the locking bar 93 (Fig. 3) sufficiently far toward the right to release the left end from the opening 92. The locking bar is then removed by a movement toward the left. The glass pane 81 is lifted out and the column spaces 19 can be filled.

It is also by the removal of the door plate 103 that access is had to the locking lever 117 (Fig. 13) for the displacement of the plungers 112 from the rest or stop 111 for the removal of the bottom 108. As previously brought out, that end of the lever 117 nearest to the drawer opening 102 is bent up at 118 so that the lever 117 can be manipulated either for unlocking or locking the plungers 112.

While the construction and arrangement of the improved vending machine is that of a generally preferred form, obviously modifications and changes may be made without departing from the spirit of the invention and the scope of the claims.

I claim:—

1. In a vending machine, a revoluble selecting shaft having a lifter movable in a fixed circular path, a slidable selector plate, a selector finger loosely hung upon the plate and gravitating to an idle position in the direction of said path, and means included in said lifter having a V-notch shaped to move the finger laterally into alinement with said path upon engagement of the finger thus to centralize the finger in respect to the lifter.

2. In a vending machine, a lifter for operating a selector finger, said lifter comprising a retainer having a notch in its outer end, a contactor having its outer contacting portion approximately level with the bottom of the notch, means to which the inner ends of the retainer and contactor have common connection, and a shaft by which said means is carried.

3. In a vending machine, a selector plate having an upstanding wall, discharger means situated on one side of the plate and having a lug extending into overlapping relationship with the wall on one side of the wall, a selector finger situated on the other side of said plate and means on the other side of the wall providing a pivotal support for the finger, said finger having a heel extending through the wall within engaging range of the lug, a selecting shaft adapted to be turned and being adjacent to the finger, and a lifter on the shaft engageable with the finger upon turning of the shaft to turn the finger on its pivotal support and engage the heel with the lug.

GEORGE E. NICHOLSON.